United States

[11] 3,594,645

[72] Inventor Clyde E. H.
  Midland, Mich.
[21] Appl. No. 768,873
[22] Filed Oct. 18, 1968
[45] Patented July 20, 1971
[73] Assignee The Dow Chemical Company
  Midland, Mich.

Primary Examiner—Robert L. Griffin
Assistant Examiner—Anthony H. Handal
Attorneys—Griswold & Burdick and Earl D. Ayers

[54] MEANS FOR TESTING A SIGNAL TRANSMITTING CIRCUIT
  13 Claims, 3 Drawing Figs.
[52] U.S. Cl. ................................................ 325/31
[51] Int. Cl. ............................................. H04b 1/00
[50] Field of Search ........................................... 325/31, 37;
  333/18; 179/175.3; 324/57 A, 57 SI

[56] References Cited
  UNITED STATES PATENTS
| | | | |
|---|---|---|---|
| 3,445,771 | 5/1969 | Clapham et al. | 333/18 X |
| 3,400,329 | 9/1968 | Cannon | 324/57 SI |
| 3,305,647 | 2/1967 | Sheffet | 179/175.3 |
| 3,227,949 | 1/1966 | Overbeck | 324/57 A |
| 3,072,904 | 1/1963 | Yaffee | 325/37 |

ABSTRACT: Means for testing a signal-transmitting circuit having a transmitting terminal, a signal-carrying means and a receiving terminal including a signal indicator connected to the receiving terminal to indicate the characteristics of the received signals, a control signal-carrying means paralleling the signal-transmitting circuit, a control signal generator located adjacent the transmitting terminal connecting to the control signal-carrying means for imparting a control signal onto the control signal-carrying means, a control signal detector located at the receiving terminal and connected to the control signal-carrying means for detecting the control signal and a test signal generator located at the transmitting terminal having an output connected to the transmitting terminal and an input connected to the control signal-carrying means whereby an operator at the receiving terminal may sequentially select test signals having different frequency and time domain characteristics for transmission over the signal-transmitting circuit, the performance of the signal-transmitting circuit being revealed by the signal indicator.

PATENTED JUL20 1971

INVENTOR.
CLYDE E. HALLMARK

BY

Griswold & Burdick
ATTORNEYS

INVENTOR
CLYDE E. HALLMARK
BY
Griswold & Burdick
ATTORNEYS

MEANS FOR TESTING A SIGNAL TRANSMITTING CIRCUIT

CROSS-REFERENCE

This application is not related to any pending United States or foreign application.

SUMMARY OF INVENTION AND BACKGROUND

This invention relates to an instrumentation control system. As an exemplification of one embodiment of the invention it will be particularly described as it is applicable to a method and apparatus for the practical measurement of frequency and time domain parameters of high information rate transmission circuits. Such circuits are commonly called "wide band" circuits, and are commonly used in transmitting signals found in high bit-rate pulse code modulated telemetry, multiplexed telemetry, high definition television, and the like. It is usually necessary that such wide band transmission circuits cover a continuous frequency spectrum of 17 or 18 octaves upward from the low end of the audiofrequency spectrum. In addition, the successful use of such wide band circuit for these and similar applications frequently requires departure from preselected frequency domain and time domain characteristics be extremely small to minimize error rate and to thus avoid significant degradation of the information signals transmitted.

Wide band circuits of the type referred to herein are usually comprised of a number of links connected in series or cascade to provide a continuous transmission circuit for conveying information signals between two nonadjacent points. Frequently such circuits are required to transmit wide band signals between points spaced many miles apart. Generally speaking, the greater the distance separating the points the greater is the number of links employed in the circuit. A link typically consists of a transmitting terminal, a length of wide band cable, and a receiving terminal. To permit balancing of the transmission circuit usually both the transmitting and receiving terminals include frequency domain equalization and amplification control adjustments so that the circuit can be calibrated to provide a flat amplitude response across the required band with frequency domain equalization adjusted within the prescribed limits according to the application of the circuit.

The necessity for frequency domain equalization in wide band circuits arises from the fact that the attenuation of wide band cables vary greatly with frequency over the extremely wide range of frequencies which such cables are required to carry. As an example, a typical length of cable may exhibit an attenuation of 80 decibels at a frequency of 4.5 MHz. and an attenuation of approximately 3 decibels at a frequency of 30 Hz. This difference in attenuation must be equalized to avoid distortion in the transmitted signal. In like manner, frequency domain equalization must be accomplished within extremely close tolerances to avoid excessive accumulation of such tolerances in a circuit configuration requiring a plurality of cascaded links. Allowable tolerances in the order of one-tenth decibel with detectability of one-hundredth decibel are common in industry.

At the present time the techniques and instrumentation required to measure the transmission characteristics of a signal transmitting circuit and to calibrate such circuit to achieve necessary time and frequency domain performance is time consuming and expensive. The typical method presently used requires two engineers, one stationed at the transmitting terminal of the circuit and the other at the receiving terminal of the circuit. Vocal communication must then be established by a separate transmitting circuit paralleling the signal-transmitting circuit being tested and calibrated. By voice communication the engineers can coordinate the introduction of selected signals at the transmitting terminal and the characteristics of the signals received at the receiving terminal is then noted. Through a process of inducing a sequence of selected signals at the transmitting terminal and observation of the characteristics of the signals received at the receiving terminal two engineers, communicating together, can eventually establish the characteristics of the transmitting circuit and ultimately make the necessary adjustments to achieve the desired final frequency and time domain characteristics required for the effective use of the circuit. This presently used system is necessarily time consuming and expensive in that it requires two engineers available at the same time at spaced locations for making the evaluations and proper adjustments.

This invention provides a means of determining the characteristics of a transmission circuit in an arrangement to eliminate the necessity for the stationing of an engineer at the transmitting terminal during the evaluation. In addition, this invention provides means for more accurate, effective, and efficient testing of a signal-transmitting circuit to enable the proper calibrations and adjustments to be made. Of primary importance is the provision of means by this invention wherein the time required for the thorough testing of a signal-transmitting circuit can be greatly reduced, therefore reducing the "down time" of the circuit being tested, that is, reducing the time which the circuit must be utilized for testing purposes rather than for its normal function of transmitting information.

It is an object of this invention to provide an instrumentation control system. Another object of this invention is to provide improved means whereby the testing and alignment of a wide band transmission circuit may be accomplished by a greatly reduced expenditure of time and manpower.

A further and more particular object of the invention is the provision of a method whereby an engineer at the receiving terminal of a signal-transmitting circuit may control the input of selected signals into the transmitting terminal of the circuit for evaluation and calibration of the transmitting circuit.

A further particular object of the invention is the provision of apparatus useful at the transmitting terminal of a signal-transmitting circuit and controllable from remote location to provide generation of signals or a sequence of signals for transmission by the signal-transmitting circuit as a means of evaluating and calibrating the signal-transmission circuit.

These and other objects of the invention will be apparent from the following description and claims.

DESCRIPTION OF THE VIEWS

DETAILED DESCRIPTION

Figure 1:
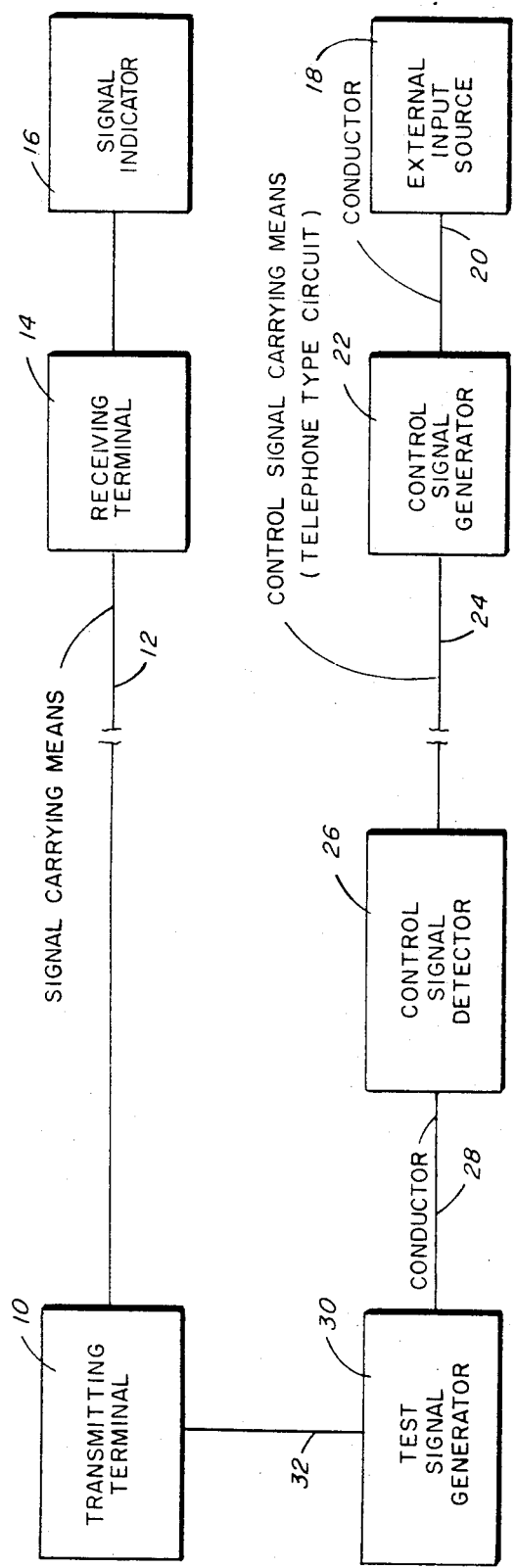
FIG. 1 is a schematic diagram of the basic arrangement for practicing the method of this invention.

Referring now to FIG. 1, a block diagram is shown of the fundamental components making up the invention. It is understood that the invention pertains to the testing and calibrating of a typical transmission circuit which consists basically of a transmitting terminal 10, a signal-carrying means 12, and a receiving terminal 14. The transmitting terminal 10 and receiving terminal 12 may, in some instances, be spaced from each other a distance of many miles. When such circuit is initially installed it must be tested to determine its transmission characteristic and proper adjustments and calibrations made so that the transmission characteristics are within prescribed limits. Typically, such limits require a preselected flatness of signal amplification through a selected frequency range and a preselected minimum signal distortion level through such range. After the initial installation and calibrations of the circuit it must be periodically retested and recalibrated to ensure the integrity of the circuit-transmitting characteristics. This invention provides a means of testing the signal-transmitting characteristics of the typical signal-transmitting circuit made up of elements 10, 12 and 14.

Basically, the method of this invention includes the use of apparatus including: a signal indicator 16 which is connected to the receiving terminal 14 to reveal the characteristics of the received signal; an external input source 18; a conductor 20 carrying the output of the external input source; a control signal generator 22 connected to input conductor 20; a control signal-carrying means 24 connected to the output of the control signal generator 22, the control signal-carrying means being such as a telephone circuit; a control signal detector 26 having the input connected to the control signal-carrying means 24; a conductor 28 connected to the output of the control signal detector 26; a test signal generator 30 having the input connected to conductor 28; and a conductor 30 connecting the output of the test signal generator 30 with the input of the transmitting terminal 10.

In the preferred arrangement of the invention the control signal carried by the control signal-carrying means 24 is of a binary digital form wherein each bit is represented by a discrete frequency sinusoid and all required bits are generated simultaneously by control signal generator 22 under control of an input of voltage or current on conductor 20. All required bits are additively combined and carried simultaneously over the control signal-carrying means 24.

The external input source 18 may provide an input of voltage or current having any preprogramed time varying form or many, alternatively, provide any discrete value input of voltage or current resulting from arbitrary manual control. The action of control signal detector 26 provides detection and restoration of the parallel digital control signal to a form suitable to a control of test signal generator 30. Signal generator 30 is preferably comprised of a multirange, sine-wave producing oscillator and other associated elements, the oscillator being arranged in such a way that the frequency of the sine-wave signal imparted to transmitting terminal 10 is under control of the digital control signal received through conductor 28.

By the arrangement of FIG. 1, an operator at the receiving terminal 14 can, through actuation of the external input source 18, impart selected signals to conductor 32 at the transmitting terminal for transmission over the signal-carrying means 12. In this way a single operator at the receiving terminal can test the signal-transmitting circuit made up of the transmitting terminal 10, signal-carrying means 12, and receiving terminal 14 to ascertain its characteristics and thereby enable him to make necessary calibrations and adjustments to bring the circuit within the required limits. The control signal detector 26 and test signal generator 30 function without manual assistance in response to digital control signals conveyed over the control signal-carrying means 24. In this arrangement a single engineer stationed at the receiving terminal can test and calibrate a signal-transmitting circuit.

Figure 2:
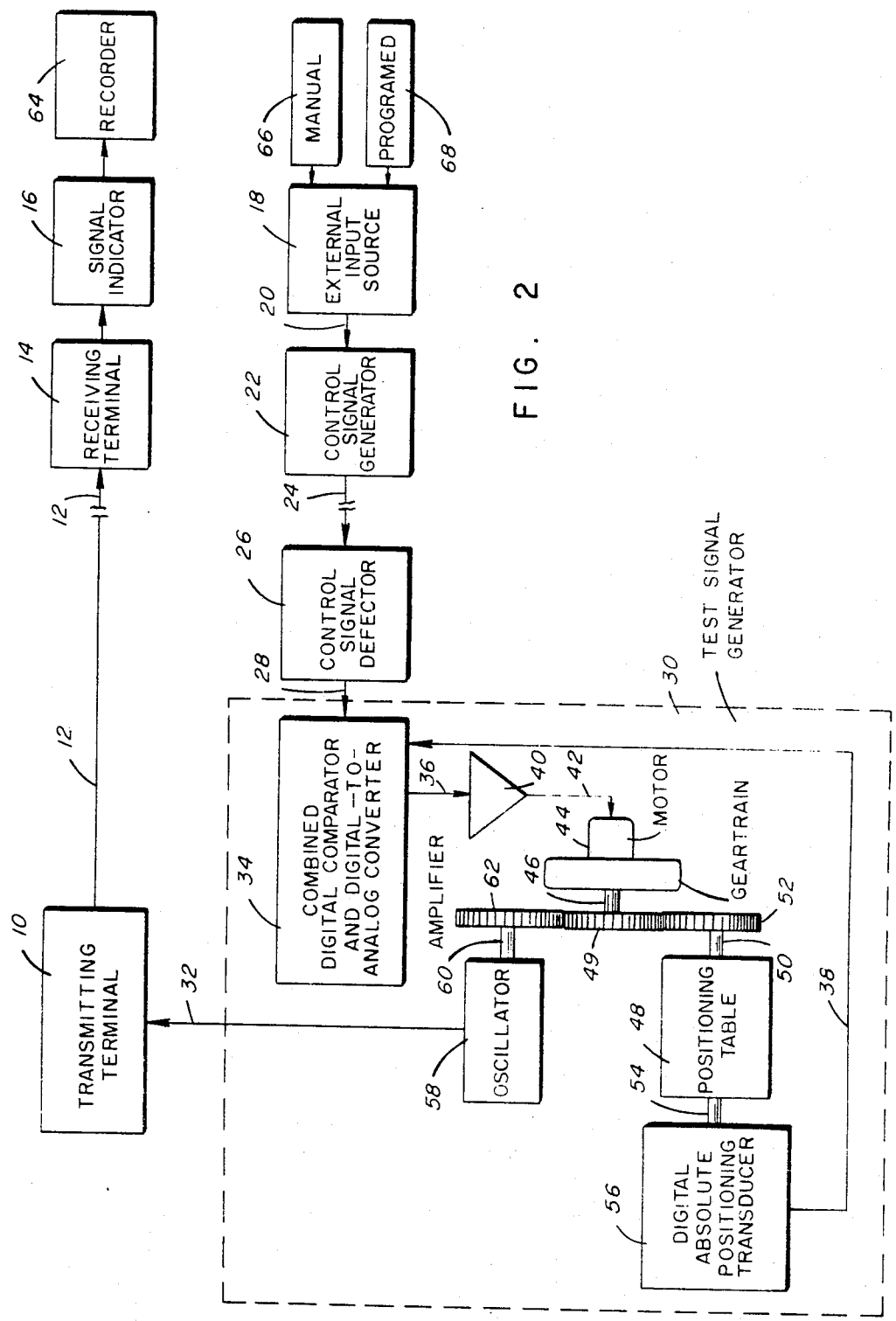
FIG. 2 is a schematic diagram, in somewhat greater detail, showing the method and apparatus where practicing the invention.

Referring to FIG. 2, a more detailed description of the invention is illustrated, particularly there is illustrated in this figure a practical embodiment of the test signal generator 30. In this embodiment the test signal generator is a form of a feedback positioning loop of the electromechanical type which provides a transverse and rotary motion of certain elements. It is understood that this is illustrated and described herein by way of example only and that other types of test signal generators adaptable to provide signal outputs in response to control signal inputs are within the purview of this invention.

The illustrated embodiment of the test signal generator 30 includes a combined digital comparator and digital-to-analog converter 34 having an input conductor 28, an output conductor 36, and a feedback input conductor 38. The test signal generator 30 further includes: an amplifier 40 having an output conductor 42; a motor having a gear train 44 with an output shaft 46, the motor being driven by electrical energy through conductor 42; a drive gear 49 affixed to a shaft 46; a positioning table 48 having an input shaft 50 with a gear 52 connected thereto meshing with drive gear 49, the positioning table being thereby positioned by servomotor 44, the positioning table having an output shaft 54; a digital absolute positioning transducer 56 having shaft 54 as an input and having feedback conductor 38 extending therefrom and communicating back to the combined digital comparator and digital-to-analog converter 34; and an oscillator 58 providing an output on conductor 32 in response to the position of a shaft 60 having gear 62 attached thereto meshing with drive gear 49, which, in turn, is driven by servomotor 44.

Positioning transducer 56 is of the type which produces a parallel binary signal having a certain number of levels or digits as required for representing the position of table 48 to a suitable degree of resolution. The use of 12 binary digits, for example, would provide a resolution of one part in 4,095 and would thus make it possible to command the positioning table to assume any of 4,095 discrete positions and, since oscillator 58 is mechanically coupled to the transducer through gears 49, 52 and 62, by way of positioning table 48, it is apparent that 4,095 discrete frequencies may be commanded from oscillator 58 to pass by way of conductor 32 to transmitting terminal 10. Thus, the oscillator 58 is under control of the digital control signal carried by the control signal carrying means 24. In this manner, a time varying sequence of discrete frequencies on conductor 32 can be arranged sufficient in total number and number per unit time to constitute the substantial equivalent of a continuous sweep test signal applied to the transmitting terminal 10.

The optimum choice of the discrete frequencies to represent the parallel digital control signal will be based on an approximate logarithmic distribution of the frequencies over the bandwidth desired to be carried by the signal-transmitting circuit under tests. Thus, in the case of a telephone circuit bandwidth extending from 300 Hz. to 3,000 Hz. over which the signal is to be carried, an approximately optimum assignment of a 12-bit signal is given in the following tabulation:

| Binary Bit 0 | Binary Bit (weighting) | Frequency (Hz.) |
|---|---|---|
| 1 | 1 | 363 |
| 2 | 2 | 441 |
| 3 | 4 | 535 |
| 4 | 8 | 646 |
| 5 | 16 | 784 |
| 6 | 32 | 949 |
| 7 | 64 | 1,150 |
| 8 | 128 | 1,360 |
| 9 | 256 | 1,688 |
| 10 | 512 | 2,042 |
| 11 | 1,024 | 2,475 |
| 12 | 2,048 | 3,000 |

The presence or absence of any one or more of these assigned frequencies in the parallel signal signifies a binary "one" or "zero" respectively for the corresponding bit. Translation of the digital signal from the frequency format to the conventional DC level format is accomplished through use of parallel fed, frequency selected amplifiers. The output of each amplifier is rectified and limited to provide a DC level corresponding to a "one" for the presence of the respective AC signal or a second DC level corresponding to a "zero" for the absence of that AC signal.

In the embodiment of the invention employing the frequency values tabulated herein, it is necessary only to provide a selectivity for each amplifier represented by a Q value of approximately 30 in order to achieve isolation of 20 decibels between adjacent frequencies. Such achievement is readily feasible within the state of the art of communication and does not require elaborate circuits, components or techniques.

As has previously been stated, the embodiment illustrated in FIG. 2 is by way of example only and other types of systems may equally as well be employed as a means of enabling the delivery to the transmitting terminal of preselected frequency signals. In addition to the parallel binary approach illustrated in FIG. 2, a serial digit or other form of control signal can be employed.

The combined digital comparator and digital-to-analog converter 34 in FIG. 2 performs the function of comparing the digital control signal with the digital feedback signal from positioning transducer 56. Comparison is made on a parallel bit basis whereby digits of like weighting are compared and any resulting differences are combined to form a servo error signal comprised of the algebraic sum of weighted digit values. This error signal, now in an analog form as a result of summing of the weighted digit, appears on conductor 36 and is amplified by amplifier 40. The amplified error signal is fed thence over conductor 42 to the servomotor 44. If the amplitude of the error signal is greater than a certain amount, generally referred to as one-half of the "dead band" of the servosystem, the motor will rotate in a direction such as to reduce the error signal and will thus change the frequency of the signal output of oscillator 58 appearing on conductor 32 and, through rotation of shaft 50, will change the position of both the positioning table 48 and digital absolute positioning transducer 56. The changing of the position of digital absolute positioning transducer 5 acts to alter the value of the digital feedback signal appearing at conductor 38 to conform with the value of the digital control signal appearing on input conductor 28. In a practical sense, it is necessary to provide weighting of only a few (for example three or four) of the low-value digits in summing to forming the analog error signal, all higher value digits being added to give a constant amplitude analog error signal representative of the saturated condition of the feedback loop. This action is illustrated graphically in FIG. 3 wherein there is plotted along the X-axis, the algebraic sum of the digital control signal and the digital feedback signal, and along the Y-axis, the analog error or difference signal over a dynamic range of plus and minus a value corresponding with that represented by the four lowest weighted digits.

The feedback control system design illustrated in FIG. 2 of the control signal generator 30 may exhibit some instability. It is understood that the use of corrective networks or other conventional stabilizing means applied in the analog portion of the loop is implicit, within the state of the art, and therefore such are not specifically disclosed herein.

Figure 3:
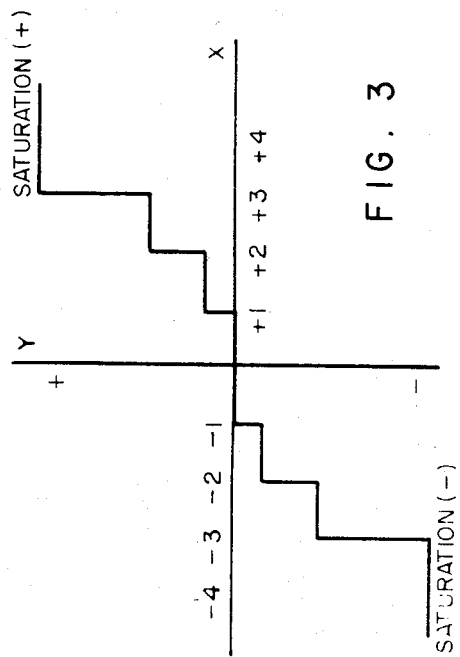
FIG. 3 is a graph in which the X-axis is the algebraic sum of the digital control signal and the digital feedback signal X- and the Y-axis is the analog error difference signal over a dynamic range of plus and minus a value corresponding with that represented by the four lowest weighted digits in a digital control signal according to one exemplified application of the invention.

Reference has been made to the "dead band" of the servo loop. The term, as employed herein, refers to the magnitude of the region of uncertainty in the nulling action of the loop as measured by the degree of positional repeatability of the system under repeated conditions, that is, under duplicate commands. Such "dead band" is a result of residual component defects, such as static and/or dynamic friction ratios, small signal nonlinearities, and so forth. It is well known in the art of the servosystems that "dead band" magnitude can generally be reduced by application of "dither" techniques. A conventional embodiment of this technique is based on the additive insertion of an externally generated sine-wave signal into the analog error signal path. The frequency of this AC "-dither" signal will generally be chosen to lie just above the signal pass band of the feedback system. Referring to FIG. 3, if the peak amplitude of such AC "dither" signal is adjusted to a value equal to or greater than that corresponding to the two least significant bits in the error signal, the servosystem will reach a null at a point approximately equidistant from the plus 1-bit and minus 1-bit error levels as illustrated.

For purposes of accomplishing the time domain or transfer function testing of the signal-transmitting circuit, it will be apparent that selection of a suitable signal generator for use in lieu of the frequency domain signal generator may be made. Such generator may be selected and controlled through the use of certain predetermined code words carried via the digital control channel. Control of the generator may include switching among several time domain standard signal modes including sine squared window, square wave, staircase, and others according to the choice of the designer. It is understood that coordinated switching of the indicating and/or recording apparatus would be contemplated in such alternative arrangements.

FIG. 1 illustrates the basic components necessary to practice the invention while FIG. 2 is an illustration by way of example as one arrangement for practicing the invention, it being understood that the invention may be practiced by arrangements other than those illustrated in FIG. 2 which has been set forth for purposes of exemplification of one practical embodiment of the invention.

An engineer practicing the method of this invention may visually observe the characteristics of the received signal or signal indicator 16 or, if so desired, a recorder 64 may be utilized to record the signal characteristics. In addition, the engineer may manually control the external input source 18 as indicated by numeral 66 or the input source 18 may be actuated by a programmed input apparatus 68, the details of which are not part of this invention but which may be in the form such as taped playback arrangement. By means of the programmed input 68 and recorder 64 the testing of the signal-transmitting circuit is, once initiated, conducted automatically with the programmed input being selected such as to introduce into the transmitting terminal the full gamut of frequency and time domain varying signals which the transmitting circuit is required to handle. The record from recorder 64 may then be studied to determine what, if any, adjustments must be made to the circuits to bring it within the required performance limits.

The invention has been described as it is particularly applied to a means for testing a signal transmitting circuit but in a broader sense it can be seen that the system may be used for the remote control of any type of instrumentation. That is, the output shaft 60, illustrated as used to vary oscillator 58, may be utilized to control virtually any type of variable instrumentation device.

It is understood that the invention is not to be limited to the abstract herein, nor the summary of the invention, nor the embodiments illustrated for the purposes of exemplification, but the invention is to be limited only by the scope of the attached claim or claims, including the full range of equivalency to which each step or element thereof is entitled.

What I claim:

1. A means for testing a signal-transmitting circuit having a transmitting terminal, a signal-carrying means and a receiving terminal, comprising:

A signal indicator means connected to said receiving terminal to indicate the characteristics of received signals;

a control signal-carrying means paralleling said signal-transmitting circuit having a first terminus located adjacent to said transmitting terminal and a second terminus located adjacent to said receiving terminal;

a control signal generator means adjacent said transmitting terminal having an output connected to said control signal-carrying means first terminus to impart a control signal onto said control signal-carrying means;

a control signal detector located adjacent said receiving terminal having an input and an output, the input being connected to said control signal-carrying means second terminus; and a test signal generator located adjacent said transmitting terminal having an output and an input, the input being connected to said control signal detector output and the output being connected to said transmitting terminal whereby an operator at said receiving terminal may sequentially select, by means of said control signal generator, said control signal-carrying means, said control signal detector and said test signal generator, test signals having different frequency and time domain characteristics for transmission over said signal-transmitting circuit, the performance of said transmitting circuit being reflected by said signal indicator.

2. An instrumentation control system comprising:

a control signal carrying means;

a control signal generator means connected to said control signal carrying means for imparting digital control signals onto said control signal carrying means:

a control signal detector having an input and an output, the input being connected to said control signal carrying means;

a combined digital comparator and digital-to-analog converter having an input, an output and a feedback input, the input being connected to the output of said control signal detector, the output providing an analog signal responsive to the digital control signal received from said control signal detector;

an amplifier having an input and an output and having the input connected to said combined digital comparator and digital-to-analog converter output;

a servomotor connected to said output of said amplifier and driven by current flow through said amplifier, the motor having an output shaft; and a digital absolute positioning transducer having an input shaft connected to and rotationally positioned by said motor output shaft, the positioning transducer providing a feedback signal output representative of the position of said motor shaft, the signal output being connected to said combined digital comparator and digital-to-analog converter feedback input whereby the signal from said control signal detector is compared with said digital feedback signal to form an analog servo error signal, such error signal being conveyed to said input of said amplifier, said servomotor output shaft serving as an instrumentation control means.

3. A means for testing a signal-transmitting circuit according to claim 1 wherein said control signal imparted onto said control signal carrying means by said control signal generator is in digital form.

4. A means for testing a signal-transmitting circuit according to claim 1 wherein said control signal imparted onto said control signal-carrying means by said control signal generator is in digital form and wherein said test signal generator includes:

a combined digital comparator and digital-to-analog converter having an input, an output and a feedback input, the input being connected to the output of said control signal detector;

an amplifier having an input and an output and having the input connected to said combined digital comparator and digital-to-analog converter output;

a servomotor connected to said output of said amplifier and driven by current flow through said amplifier, the motor having an output shaft;

an oscillator having an output, the oscillator providing selectable output signals, the oscillator including an output signal control shaft connected to said motor shaft, the oscillator thereby providing a signal output of a character responsive to the rotational position of said motor shaft; and a digital absolute positioning transducer having an input shaft connected to and rotationally positioned by said motor shaft, the positioning transducer having a signal output connected to said combined digital comparator and digital-to-analog converter feedback input whereby said digital control signal is compared with said digital feedback signal to form a servo error signal, such error signal being conveyed to said input of said amplifier.

5. A means for testing a signal-transmitting circuit according to claim 4 including a positioning table having an input shaft connected to said servomotor output shaft and having an output shaft connected to said digital absolute positioning transducer.

6. A means for testing a signal-transmitting circuit according to claim 1 wherein said test signal generator includes a feedback positioning loop arrangement providing selectable frequency test signal input to said transmitting terminal in response to digital signal transmitted by said control signal generator means.

7. A means for testing a signal-transmitting circuit according to claim 1 wherein said operator at said receiving terminal includes a programmed input apparatus adaptable to automatically actuate said control signal generator to impart a sequence of preselected frequency and time domain signals over said signal-transmitting circuit.

8. A means for testing a signal-transmitting circuit according to claim 1 including a recording means connected to said signal indicator for recording the characteristics of the signal received at said receiving terminal.

9. A means for testing a signal-transmitting circuit having a transmitting terminal and a receiving terminal, comprising:

a signal indicator connected to said receiving terminal to indicate the characteristics of received signals;

a control signal carrying means paralleling said signal-transmitting circuit having one terminus adjacent said transmitting terminal and the other terminus adjacent said receiving terminal a control signal generator means at said receiving terminal operable to selectively impart a digital control signal onto said control signal carrying means;

a control signal detector at said transmitting terminal having an input and an output, the input being connected to said control signal carrying means;

an electromechanical feedback positioning loop means having an output shaft, the angular position of said shaft being responsive to the digital control signal received from said control signal detector; and an oscillator having an input shaft and an output lead connected to said transmitting terminal, the input shaft being connected to said feedback positioning loop means output shaft whereby the output of said oscillator is controllable by the binary digital signal output of said control signal generator at said receiving terminal.

10. A means for testing a signal-transmitting circuit according to claim 9 wherein said electromechanical feedback position loop means includes:

a combined digital comparator and digital-to-analog converter having an input, an output and a feedback input, the input being connected to the output of said control signal detector;

an amplifier having an input and an output and having the input connected to said combined digital comparator and digital-to-analog converter output;

a servomotor connected to said output of said amplifier and driven by current flow through said amplifier, the motor having an output shaft, said oscillator input-output being connected to said motor shaft, oscillator thereby providing a signal output of a character in response to the rotational position of said motor shaft; and a digital absolute positioning transducer having an input shaft connected to and rotationally positioned by said motor output shaft, the positioning transducer having a signal output connected to said combined digital comparator and digital-to-analog converter feedback input whereby said digital control signal is compared with said digital feedback signal to form a servo zero error signal, such error signal being conveyed to said input of said amplifier.

11. A means for testing a signal-transmitting circuit according to claim 10 including a positioning table having an input shaft connected to said servomotor output shaft and having an output shaft connected to said digital absolute positioning transducer.

12. A means for testing a signal-transmitting circuit according to claim 9 including a recording means connected to said signal indicator for recording the characteristics of the signal received at said receiving terminal.

13. An instrument control system according to claim 2 including a positioning table having an input shaft connected to said servomotor output shaft and having an output shaft connected to said digital absolute positioning transducer.